June 18, 1963 P. P. WHITE 3,094,244
DISPENSING RECEPTACLES
Filed April 28, 1960
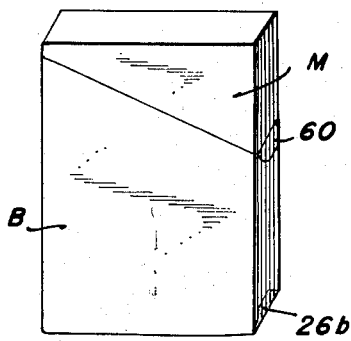
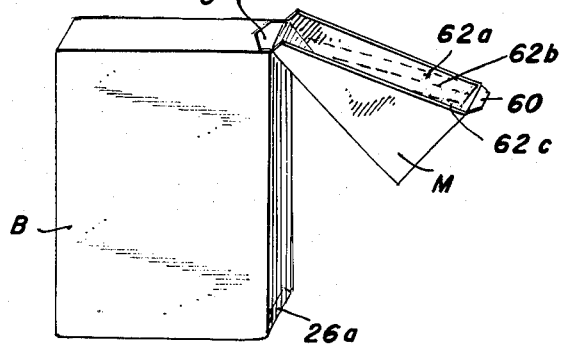
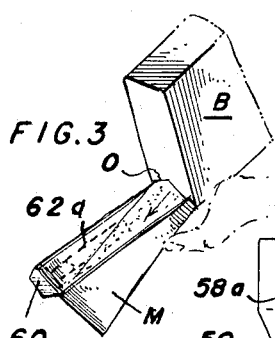
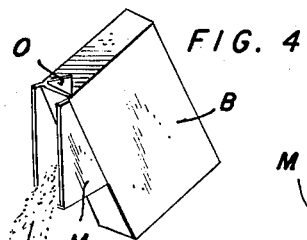
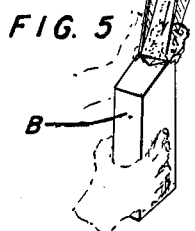
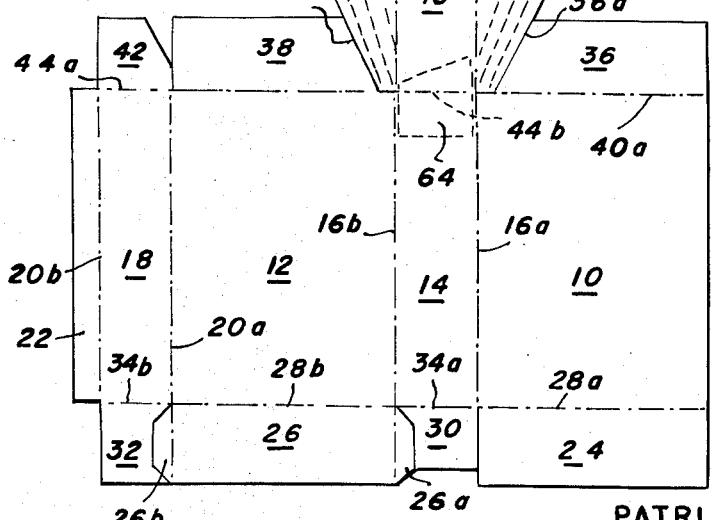
INVENTOR
PATRICIA P. WHITE
ATTORNEY

United States Patent Office 3,094,244
Patented June 18, 1963

3,094,244
DISPENSING RECEPTACLES
Patricia P. White, 1015 Woodrow Ave., Norfolk, Va.
Filed Apr. 28, 1960, Ser. No. 25,368
3 Claims. (Cl. 222—23)

This invention relates to improvements in dispensing receptacles, and more particularly to an improved carton or paper-type of dispensing receptacle incorporating means for measuring the material being dispensed.

While numerous attempts have been made previously to provide an acceptable paper-box type of receptacle with built-in or attached measuring unit for measuring out the contents thereof desired to be dispensed, such have not been too successful due to one or more of a variety of reasons such as complicated and/or impractical construction, difficulty in rendering the measuring unit or attachment functional, uncertain measuring operation, etc. Accordingly, it is a major object of the present invention to provide an inexpensive, practical, easy to operate, and thoroughly dependable carton or paper-box type of receptacle having built-in measuring means for dispensing measured quantities of the packaged material therefrom.

A more particular object is the provision of a dispensing type of package or carton incorporating built-in measuring and dispensing means which is characterized not only by simple, inexpensive construction, but also is admirably suited to the needs of the housewife called upon many times during the course of her day to dispense small measured quantities, i.e. a quarter, half or full cup, or more, of granular or dry flowable material such as soap powder, detergents, rice, cereal, etc. from cartons or paper boxes in which such products are conventionally purchased.

A further, very practical object of the invention is the provision of an improved carton or paper-box type of receptacle incorporating measuring means for dispensing measured quantities of material therefrom whose design is such that it may be die-cut complete in one operation, assembled similar to a folded-blank box, and filled in the conventional way.

Ancillary objects of the invention are the provision of an improved dispensing carton-type of receptacle characterized by an operable top constructed and arranged as also to function as a dispensing and measuring attachment for said carton; the provision of a carton-type receptacle having a dispensing and contents-measuring top or cover part as aforesaid which easily permits the return of any excess amounts to the carton by a simple pouring-back operation; and the provision of a carton and a contents-measuring attachment therefor wherein said attachment may be readily removed from the carton for use independently thereof, i.e. with other cartons not provided with such an attachment.

The above and other objects of the improved carton or paper-box type of dispensing receptacle with built-in measuring attachment or unit according to the invention will be understood from the following detailed description thereof, in which reference is had to the accompanying drawings illustrating a preferred physical embodiment thereof, wherein—

FIG. 1 is a front perspective view showing the improved receptacle closed;

FIG. 2 is a similar view but illustrating the receptacle open;

FIG. 3 is a broken-away perspective view which illustrates the manner of using the improved receptacle to measure a desired quantity of the contents thereof to be dispensed;

FIG. 4 is a perspective view illustrating the operation of dispensing a measured quantity of the contents of the receptacle, it being observed that the receptacle is now held upright to prevent any excess amount of the material spilling from the receptacle proper;

FIG. 5 is a perspective view illustrating the ease of pouring back any excess amount of the material to the receptacle proper;

FIG. 6 is a perspective view illustrating the manner of using the measuring unit as such when detached from the carton; and FIG. 7 is a face view illustrative of a one-piece blank from which the carton or paper-box type receptacle with built-in measuring attachment according to FIGS. 1–4 is fashioned.

Referring to the drawings in detail, a dispensing-type receptacle having a built-in measuring unit or attachment to which the present invention is addressed comprises a box or carton body B preferably of the so-called folded-blank type and measuring unit M also serving as an openable cover or top for said box body. It is a feature of the invention that both box body B and measuring unit M are integral and are moreover fashioned from a single blank capable of being die cut in a single operation. Such a blank is illustrated in FIG. 7 wherein dot-and-dash lines indicate lines of fold and solid lines indicate both outer-edge lines and lines of cut inwardly thereof.

More particularly, such a blank provides (in the set-up box) front and rear walls 10, 12, an intermediate end wall 14 connected thereto by vertical lines of fold 16a, 16b, and an opposite end wall 18 connected to said rear wall 12 by a vertical line of fold 20a, said end wall 18 carrying a vertical edge flap 22 connected thereto by a vertical line of fold 20b, which flap is adapted in the assembly operation to be glued or otherwise fastened to the inner face of the front wall 10, thus to secure said front, rear and end walls together as a rectangular open-ended box body. The bottom of the box body is provided by elongated flaps 24, 26 connected to the bottom edges of said front and rear walls 10, 12 by horizontal lines of fold 28a, 28b, and by end-wall bottom flaps 30, 32 connected to said end walls 14, 18 by horizontal lines of fold 34a, 34b. Illustratively, the bottom flap 26 is provided with tabs 26a, 26b extending laterally from its side edges proper and preferably cut out of the material of the adjacent end-wall flaps 30, 32 which, in box assembly, are adapted to extend upwardly over and to be adhesively attached to the outer faces of the end walls, thereby to secure the box bottom in its closed position. However, other folded-blank box bottom constructions may be employed, and this also applies to the means (flap 22) for securing the vertical walls of the box body in their erected position.

The box top proper is comprised by main top flaps 36, 38 connected to the upper edges of the front and rear walls 10, 12 by horizontal lines of fold 40a, 40b, respectively, and by a supplemental end-wall flap 42 connected to the aforesaid end wall 18 by a horizontal line of fold 44a, it being understood that said top flaps are permanently secured in top-closing position. However, according to the invention, the otherwise closed (when assembled) box body is provided with a contents dispensing opening O (FIGS. 2 and 4) by terminating the adjacent end edges of the top flaps 36, 38, i.e. the edges adjacent the end wall 14, short of said end wall, and preferably with oppositely inclined edges indicated by the reference numerals 36a, 38a. Such top flap arrangement results in the formation of a contents-dispensing opening of size determined by the setting back of said edges 36a, 38a from the top edge of the end wall 14, and which is disposed in the box top adjacent said end wall.

According to a further important feature of the invention, the aforesaid box body, which is closed at its bottom end and also at its top end except for said dispensing opening O, is provided with a measuring attachment or unit (hereinbefore designated M) consisting of an extension flap 46 connected to the top edge of the box-body end wall 14 by a horizontal line of fold 44b and having length corresponding to the width of said front and rear walls 10, 12 and width corresponding to that of said end wall 14, depending side wings 48, 50 which are connected to said extension flap along horizontal fold lines 52a, 52b, respectively, and an end wall structure preferably comprising relatively inturned securing flaps 54, 56, 58 connected respectively to said flap extension 46 and wing flaps 48, 50 along lines of fold 54a, 56a and 58a. The aforesaid construction is such that said parts 46–58 when assembled (see FIGS. 1 and 2) form a generally triangular-shaped swing-cover and container unit M which is hingedly connected to the previously described box body for swinging movement about the fold line 44b from and to a closed position (FIG. 1) to and from open positions (FIGS. 2–4).

In its closed position the aforesaid swing-cover and container unit is adapted to telescope over and hood the upper end of the box body B thereby to provide a top cover and closure for the dispensing opening O. In its open position, said cover and container unit exposes said dispensing opening and it also provides a generally triangular-shaped trough or container in alignment with said opening for receiving the contents of the box body dispensing therefrom through said opening O. Preferably, the end-wall flap 54 of the cover and container structure M is provided with an extension tab 60 which is preferably unattached to the box end-wall 14 which it overlies when said box is fully closed as in FIG. 1, said tab serving as a grip tab which facilitates gripping of said unit preliminary to swinging it to open position.

The aforesaid cover and container unit M is adapted to function as a measuring means for measuring out predetermined amounts of the box contents being dispensed and hence the inner faces of its side walls 48, 50 are provided with indicia such as graduated lines 62a, 62b, 62c denoting the level of material in said container space making up common amounts usually dispensed from paper box or carton type of commodity packages such as one-quarter cup, one-half cup, one full cup, and the like. Thus a housewife desiring to measure out a cup full of rice or soap powder, for example, from a carton thereof is required only to swing open the cover and container, now capable of functioning as a measuring unit or attachment M, to a position in which said measuring graduations are substantially horizontal and thereupon tilt the box body relative to said unit as in FIG. 3, whereupon the contents will flow into the unit to a depth designated by the one-cup line. To dispense such measured quantity, it is necessary only to swing the box body and said measuring unit relatively towards one another until both assume substantially vertical positions as in FIG. 4. (Here it is observed that the unit M has swung throughout a 270° arc from its FIG. 1 position.) During the course of this movement the measured amount of the material contained therein spills over the deep end wall (54, 56, 58) of said unit, and the contents of the box proper are prevented from discharging through the dispensing opening O consequent to the uprighting of the box body when returning to its substantially vertical position as aforesaid.

Should it be desired to return the contents of the measuring unit or any unused portion thereof to the box or carton interior, such may be simply effected by swinging the measuring unit to a substantially vertical position above the box then also held substantially vertical, wherein the contents pour back into said box through the aforesaid dispensing opening O, as in FIG. 5.

While it is intended that the measuring unit M will normally be retained as an integral part of the box or carton B when said box or carton has been emptied, it may be simply detached therefrom for use independently thereof, for example, to measure out the contents of a a package not provided with a measuring unit as herein provided. Such is indicated in FIG. 6 showing the detached unit M–1 being used to measure amounts of material dispensing from a conventional carton or paper box B–1 devoid of any means for contents measurement.

It will be understood that while the measuring unit is shown to have triangular configuration in side view, any other configuration suitable to the aims and functioning of the herein device may be substituted. Incidentally, to provide the side wings or walls 48, 50 of the measuring unit M with some depth adjacent the hinge end of the unit, the narrow-end edge of said side walls terminates on the aforesaid top flap fold lines 40a, 40b at points which are spaced from the top corners of the assembled box which are defined by the junctions of said fold lines with the vertical fold lines 16a, 16b. Thus, when the box is fully closed as in FIG. 1, the side wings 48, 50 overlap the front and rear walls 10, 12 for the full width of the latter, as prevents leakage of contents through said top corners which are closely adjacent said dispensing opening O.

If considered necessary or desirable, the hinge (fold) line 44b may be strengthened as by a piece of adhesive tape 64 or equivalent applied as indicated to the portions of the end wall 14 and extension flap 46 adjacent said hinge line, said piece of course extending across and thereby reinforcing said hinge line against breaking away in continued use of the measuring unit.

Without further analysis, it will be appreciated that a box carton body constructed as described and provided with a measuring unit as an integral attachment according to the invention achieves the desirable objectives therefor as explained in the foregoing. However, as many changes could be made in carrying out the above constructions without departing from the scope of the invention, it is intended that all matter contained in the above description or shown in the accompanying drawings shall be interpreted as illustrative and not in a limiting sense.

I claim:

1. A dispensing receptacle for granular and like flowable materials comprising, in combination, a carton-type receptacle having a permanently closed top wall provided with a small-area contents-dispensing opening disposed immediately adjacent one end edge of said top wall and a measuring attachment hingedly connected to said receptacle along said end edge, said measuring attachment comprising a combined dispensing-opening cover and a dispensed-contents receiving and containing unit, said unit extending the full width of said receptacle and adapted in its closed position to telescope over and hood the closed top and upper end portion of said receptacle and in a first open position to receive material dispensing from said receptacle through said opening and in a second open position to discharge the so-received material, said unit having indicia representative of the quantity of the material received therein from the receptacle, said receptacle and measuring attachment being formed complete from a single blank of sheet material folded to form a receptacle proper and the aforesaid combination cover and measuring container unit constituting said attachment.

2. A dispensing receptacle for granular and like flowable materials comprising, in combination, a carton-type receptacle having a permanently closed top wall provided with a small-area contents-dispensing opening disposed immediately adjacent one end edge of said top wall and a measuring attachment hingedly connected to said receptacle along said end edge, said measuring attachment comprising a combined dispensing-opening cover and a dispensed-contents receiving and containing unit, said unit extending the full width of said receptacle and adapted in its closed position to telescope over and hood the closed top and upper end portion of said receptacle and in a first open position to receive material dispensing from said receptacle through said opening and in a second open position to discharge the so-received material, said unit having indicia representative of the quantity of the material received therein from the receptacle, said receptacle comprising a box-like body portion having overlying top flaps permanently secured in face engagement, said top flaps terminating short of the aforesaid top edge of one end wall of said body to which said measuring attachment is hinged thereby to define said dispensing opening, said attachment being connected to said top edge for swinging movement from its said closed position to its said second position which is 270° removed from its said closed position and in which it extends vertically along said end wall.

3. A dispensing receptacle for granular and like flowable materials comprising, in combination, a carton-type receptacle having a permanently closed top wall provided with a small-area contents-dispensing opening disposed immediately adjacent one end edge of said top wall and a measuring attachment hingedly connected to said receptacle along said end edge, said measuring attachment comprising a combined dispensing-opening cover and a dispensed-contents receiving and containing unit, said unit extending the full width of said receptacle and adapted in its closed position to telescope over and hood the closed top and upper end portion of said receptacle and in a first open position to receive material dispensing from said receptacle through said opening and in a second open position to discharge the so-received material, said unit having indicia representative of the quantity of the material received therein from the receptacle, said receptacle comprising a box-like body having front and rear walls, end walls, a closed bottom and a top closed except for said dispensing opening, and said combined cover and measuring container unit comprising a bottom wall extending from the end wall adjacent said dispensing opening and being substantially coextensive with the receptacle top and depending integral side walls and an end wall which correspond generally to the front and rear walls and other end wall of said receptacle and which are adapted to overlie said receptacle walls when said unit is in its closed position.

References Cited in the file of this patent

UNITED STATES PATENTS

| | | |
|---|---|---|
| 887,953 | Moonert et al. | May 19, 1908 |
| 1,240,563 | Griffith et al. | Sept. 18, 1917 |
| 2,430,204 | Baker | Nov. 4, 1947 |
| 2,688,422 | Eisenberg | Sept. 7, 1954 |
| 2,770,403 | Eckley | Nov. 13, 1956 |